March 31, 1970 D. E. YOCHEM 3,503,709
METHOD AND SYSTEM FOR TESTING BLOOD SAMPLES FOR
THROMBUS FORMATION TIME
Filed Oct. 26, 1967 4 Sheets-Sheet 1
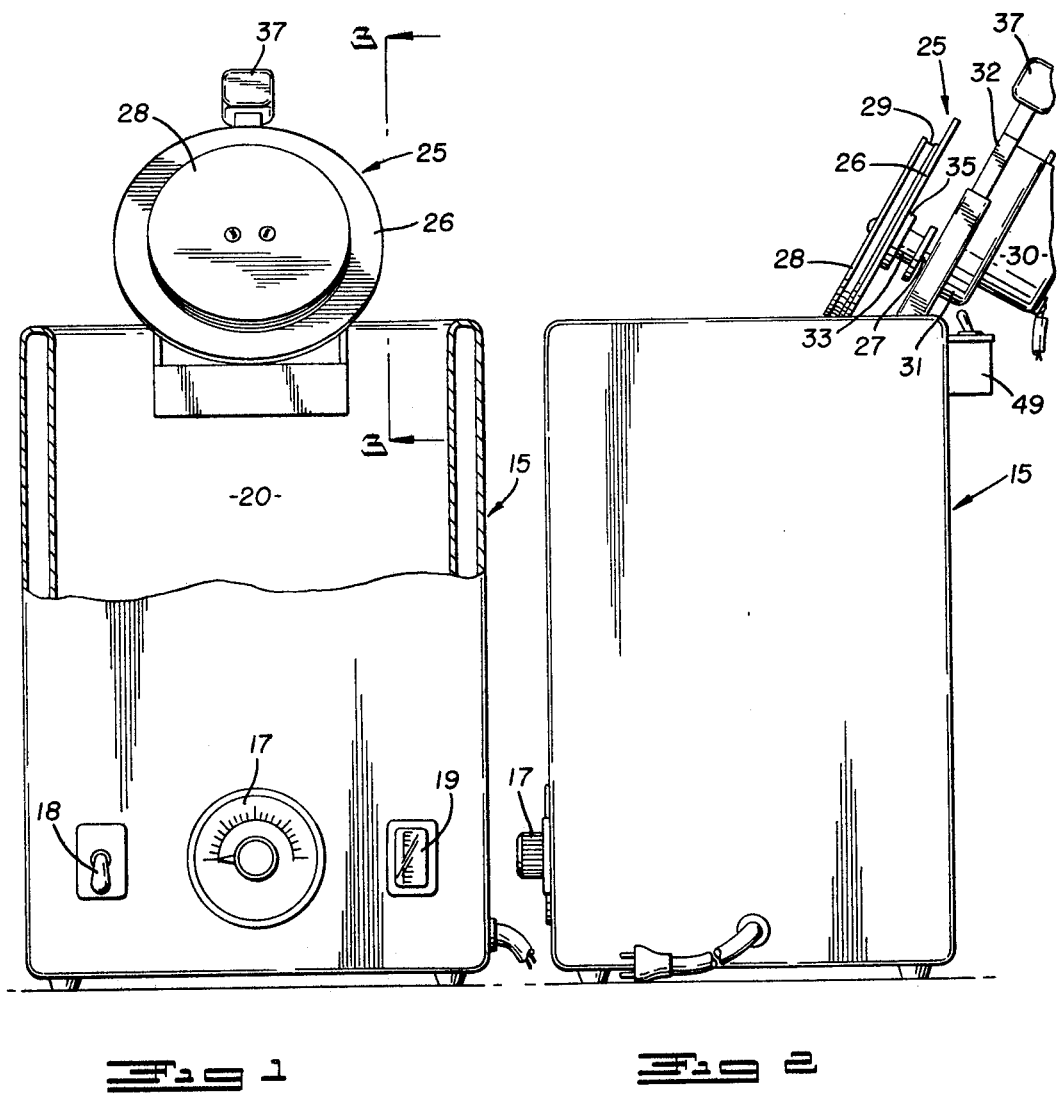
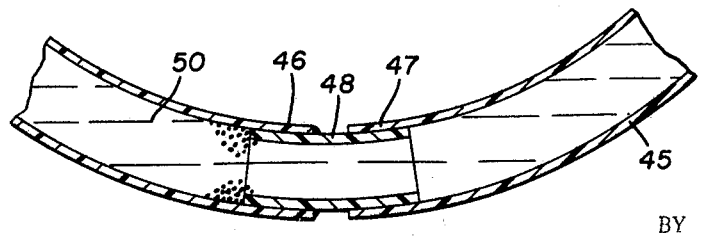
INVENTOR.
DONALD E. YOCHEM
BY
MAHONEY, MILLER & RAMBO
BY Wm. V. Miller
ATTORNEYS March 31, 1970     D. E. YOCHEM     3,503,709
METHOD AND SYSTEM FOR TESTING BLOOD SAMPLES FOR
THROMBUS FORMATION TIME
Filed Oct. 26, 1967     4 Sheets-Sheet 2
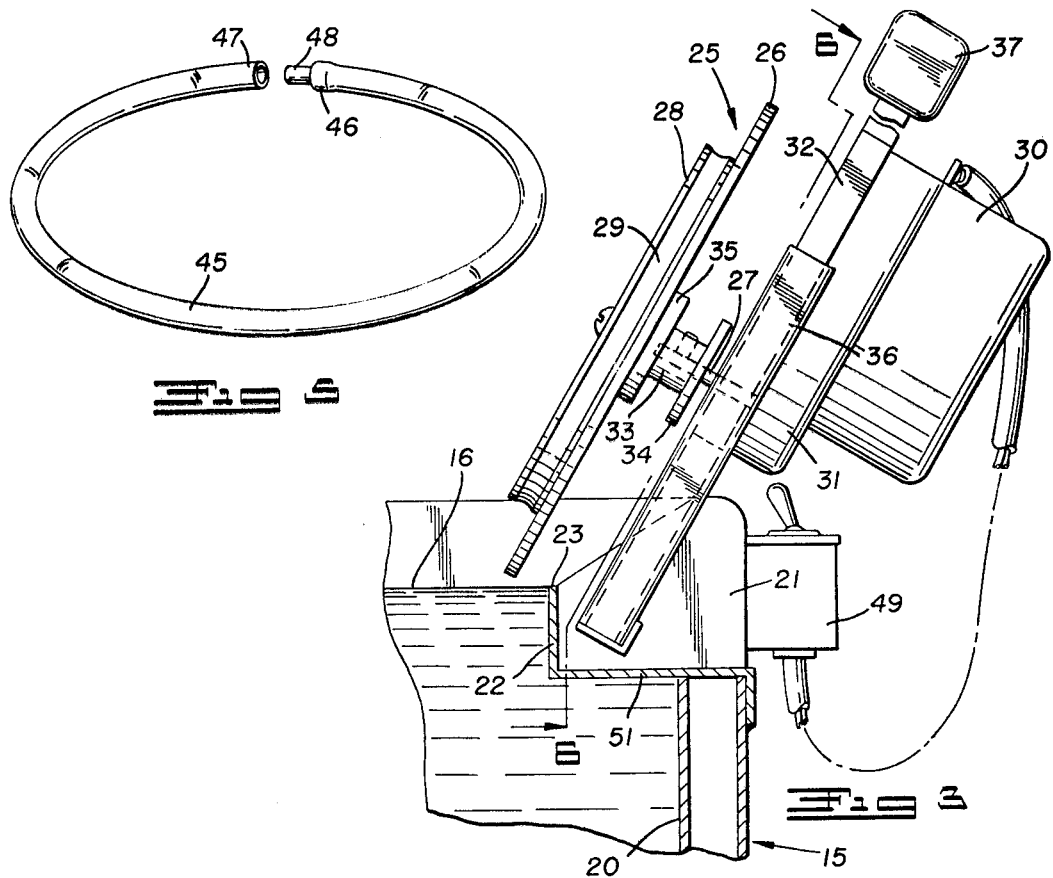
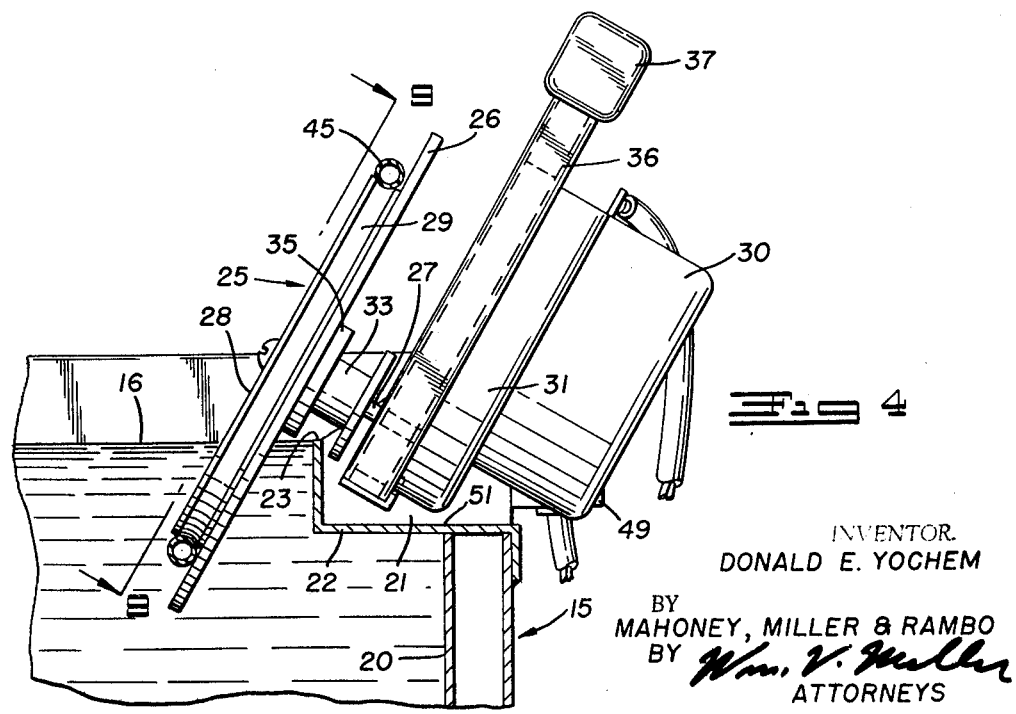
INVENTOR.
DONALD E. YOCHEM
BY
MAHONEY, MILLER & RAMBO
BY
ATTORNEYS March 31, 1970   D. E. YOCHEM   3,503,709
METHOD AND SYSTEM FOR TESTING BLOOD SAMPLES FOR
THROMBUS FORMATION TIME
Filed Oct. 26, 1967   4 Sheets-Sheet 3
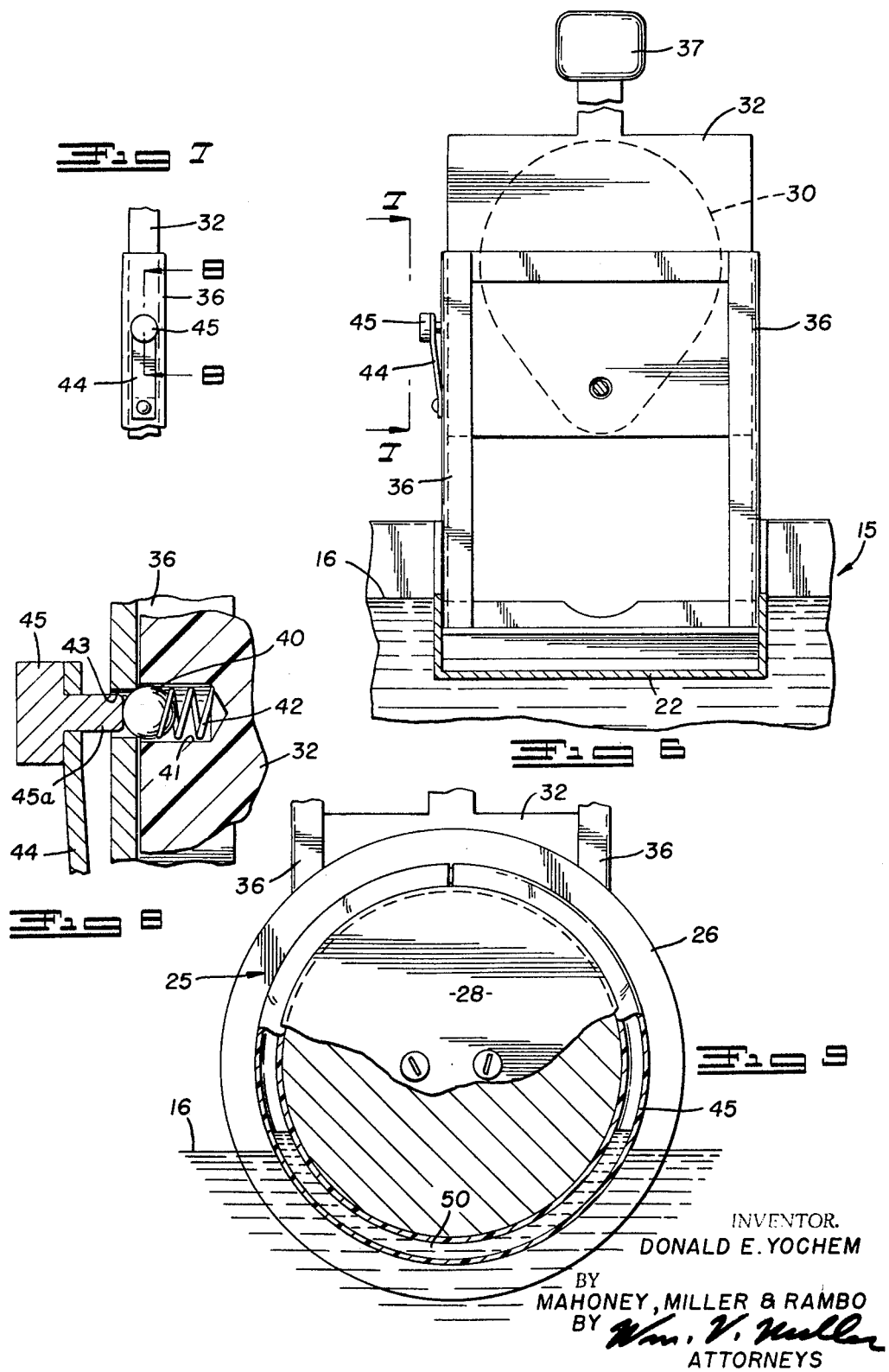
INVENTOR.
DONALD E. YOCHEM
BY
MAHONEY, MILLER & RAMBO
BY Wm. V. Miller
ATTORNEYS March 31, 1970     D. E. YOCHEM     3,503,709
METHOD AND SYSTEM FOR TESTING BLOOD SAMPLES FOR
THROMBUS FORMATION TIME Filed Oct. 26, 1967     4 Sheets-Sheet 4

DONALD E. YOCHEM
BY MAHONEY, MILLER & RAMBO
BY
ATTORNEYS

United States Patent Office
3,503,709
Patented Mar. 31, 1970

3,503,709
METHOD AND SYSTEM FOR TESTING BLOOD SAMPLES FOR THROMBUS FORMATION TIME
Donald E. Yochem, 3227 Tremont Road, Columbus, Ohio 43221
Filed Oct. 26, 1967, Ser. No. 678,405
Int. Cl. G01n 11/04, 33/16
U.S. Cl. 23—230                         13 Claims

ABSTRACT OF THE DISCLOSURE

A method and equipment for testing a sample of blood to determine the time it takes for a thrombus to form in the specific sample. The method and equipment are designed to simulate actual conditions in the human body during thrombus formation in regard to the maintaining of body temperature during the test and the provision for a restricted passage, simulating the restricted passage in a blood vessel in the body at the time of thrombus formation, and the movement of blood through the restricted passageway or past an obstruction as in an obstructed blood vessel.

PRIOR ART, GENERAL DESCRIPTION AND OBJECTS OF THE INVENTION

This invention involves the temperature control of blood while it is being tested for the thrombus formation time which is also termed the thrombotic coagulation time. When the thrombus formation time is tested in the usual prior art way, the blood is subjected to the room temperature of the laboratory while it is being tested. The room temperature of the same and different laboratories usually varies between 24° C. and 26° C.

In the blood test of my invention, as with certain other types of blood tests, optimum results are obtained when the blood is maintained close to 37° C., which is body temperature, while the blood is being tested. Studies showed that optimum results were obtained when the temperature of the blood was maintained at 37° C. with a temperature variation of plus or minus ½° C. while it was being tested. From the foregoing, it is obvious that when the thrombus formation time is being tested at the usual room temperatures, the temperature of the blood will be more than 10° C. below a body temperature of 37° C. Furthermore, it is obvious that the test will not give optimum comparative results when the blood is subjected to the usual variations in room temperature.

My blood test system maintains the blood at a body temperature of 37° C. with a temperature variation of plus or minus ½° C. at the usual room temperatures. As will be explained later, the temperature control of the blood is accomplished with an accurate laboratory hot water bath that maintains the water temperature within plus or minus ½° C. of the desired temperature when properly adjusted in addition to other means. In my experiments the thermostat of the water bath was adjusted to maintain a constant water temperature of 37.0° C. to 38.0° C. Then with a special electronic temperature probe and telethermometer, it was found that the temperature of the blood was ½° C. lower than the temperature of the water in the water bath when the apparatus to be described was used at the usual room temperatures. It is obvious, therefore, that when the minimum temperature of the water bath is 37.0° C. the temperature of the blood will be 36.5° C. and when the maximum temperature of the water bath is 38.0° C. the temperature of the blood will be 37.5° C. when the thermostat is properly adjusted for the usual room temperatures.

Before describing my invention and other related pertinent details, it is important to point out that a thrombus is distinctly different from an ordinary blood clot. It has been adequately proven by scientists that movement of blood is necessary to produce a thrombus, whereas movement of the blood is not necessary to produce an ordinary blood clot. Therefore, devices that are used to test the clotting time of blood and similar tests are not suitable for testing the thrombus formation time of blood because such devices do not cause adequate movement of the blood to produce a thrombus. Such devices produce only ordinary clots.

The application of my invention for testing the thrombus formation time of blood will be appreciated from the following description. The procedure for the test and rotating device used to cause adequate movement of the blood to produce a thrombus are similar to that generally used except that other devices do not maintain the temperature of the blood at 37.0° C., plus or minus ½° C., since the thrombus formation time is tested at room temperature of the laboratory. The rotating device and plastic tubing that holds the blood for testing used in the prior art are referred to as a Chandler apparatus which does not have an integral mechanism to control the temperature of the blood while it is being tested.

The thrombus formation time is tested according to the Chandler method as follows: A small amount of blood is withdrawn from a vein of the subject in the usual manner and a specific volume transferred to a test tube containing an anticoagulant which prevents the blood from clotting. Then a pipet is used to transfer a specific volume of the unclotted blood to a transparent plastic tubing by holding the tubing in a U-shaped position. The internal diameter of the tubing may vary from about ⅛ to about ¼ inch and be of sufficient length to make a circle about 3 to 4 inches in diameter when the ends of the tubing are joined. This annular tube is then mounted on a turntable and is rotated until thrombus formation is noted in the tube and, as explained above, this is done at room temperature.

With the conventional type of Chandler plastic tubing, the ends of the tube are connected together by an external coupling exteriorly telescoping with the ends of the tube so that there is substantially no restriction to blood movement through the tube at the coupling during rotation on the turntable. In contradistinction to this exernal coupling, I provide an internal coupling which telescopes in the ends of the tube and provides a restricted passage or obstruction to the relative flow of the blood.

BRIEF DESCRIPTION OF DRAWINGS

In the accompanying drawings, I have illustrated examples of instruments useful in my method and system for testing blood to determine thrombus formation time but it is to be understood that specific details thereof may be varied.

In these drawings:

FIGURE 1 is a front elevational view, partly cut away, of one form of instrument useful in connection with my invention.

FIGURE 2 is a side elevational view of the instrument of FIGURE 1.

FIGURE 3 is an enlarged detail in vertical section taken along line 3—3 of FIGURE 1 showing the turntable disc in raised loading position out of the water bath.

FIGURE 4 is a view similar to FIGURE 3 but showing the disc in lowered testing position partly immersed in the water bath.

FIGURE 5 is a perspective view of a transparent tube used to hold a blood sample to be tested according to my invention.

FIGURE 6 is a transverse sectional view taken along line 6—6 of FIGURE 3.

FIGURE 7 is a detail in enlarged side elevation taken along line 7—7 of FIGURE 6.

FIGURE 8 is a detail in enlarged vertical section taken along line 8—8 of FIGURE 7.

FIGURE 9 is a face view of the disc turntable taken along line 9—9 of FIGURE 4 showing the transparent blood-sample holding-tube mounted thereon with part broken away to show the contents.

FIGURE 10 is a detail in enlarged axial section showing the ends of the transparent tube coupled together in accordance with this invention to provide a restricted passage or obstruction to the flow of blood.

DETAILED DESCRIPTION OF THE DRAWINGS

Figure 11:
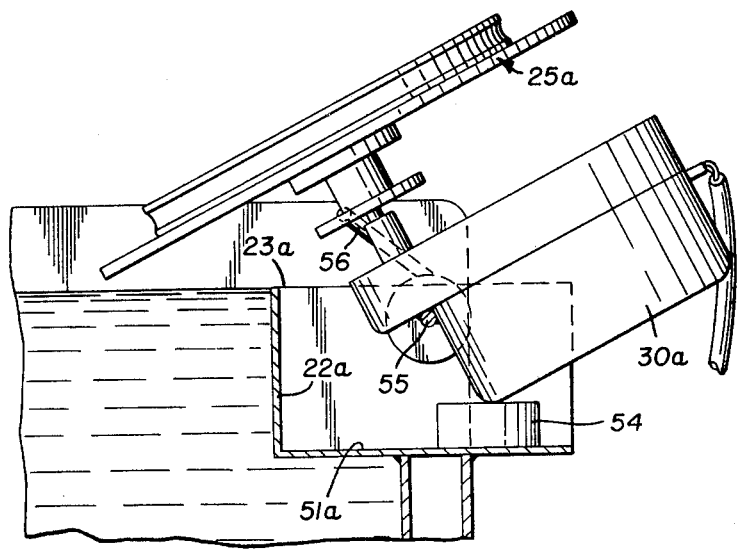
FIGURE 11 is a view similar to FIGURE 3 but showing a modification of the adjustable mounting means for the disc turntable and showing the turntable in raised loading position out of the water bath.

With specific reference to the drawings and especially to FIGURES 1 and 2, I have illustrated an arrangement for providing a temperature-maintaining water bath which may, in its general structure, be a hot water bath 15, similar to the usual accurate standard hot water bath, that will maintain a constant water temperature of 37° C. to 38° C. at the usual room temperature of 24° C. to 26° C. However, it is to be understood that I am not limited to this particular design of water bath since it is only important to provide means for maintaining a predetermined level of hot water indicated at 16 which is readily accessible for immersion of test objects. The temperature of the water 16 may be maintained by the usual electrical heating arrangement controlled by a suitable device 17 and a main off-on switch 18 and having an indicator light 19 (FIGURE 1) that monitors action of the hot water bath heating element.

The housing of the water bath is shown as being of substantially square cross section and open at its top for ready access. As distinguished from the usual water bath, a suitable portion of the rear vertical wall 20 is removed at its upper edge to receive an arrangement for providing a dry space or compartment 21 and this may be in the form of a dry-box 22 which is mounted in the recess in the wall and which opens upwardly and rearwardly. The wall of this box, as shown best in FIGURES 3 and 4, provides a weir or dam edge 23 over which the water 16 will spill if it tends to rise beyond the level determined by the edge 23.

A turntable unit 25 is provided in cooperation with a dry-box 22 for mounting and moving the blood sample during the testing operation. This turntable composes a disc 26 preferably of aluminum, which is carried on a spindle shaft 27. On the face of this disc 26 is fastened coaxially therewith a second and thicker disc 28, also preferably of aluminum, which has a groove or channel 29 extending around its periphery. It will be noted at the disc 28 is of substantially less diameter than the disc 26 which carries it. Disc 26 has an integral hub 35 for mounting it on the spindle 27.

The spindle 27 is driven from an electric motor 30 through the usual speed-reduction gearing contained within an extension 31 of the motor housing. The motor is carried by a slide 32 for vertical sliding movement in the upper end of the water bath 15 in association with the dry-box 22. However, it should be noted that in all positions of adjustment of the slide, the spindle 27 is tilted at an angle rearwardly and downwardly. Mounted on the spindle 27 behind the flange 35 of the disc 26 is a hub 33 which is keyed thereto by a set screw and which has a rear flange or baffle 34 formed thereon.

The slide 32 is in the form of a plate which has its side edges disposed in parallel guide channels 36, as shown best in FIGURE 6. The upper edge of slide 32 is provided with an upwardly projecting knob 37 for moving the slide vertically up or down in the channels 36 which will be canted rearwardly. Vertical movement of the slide 32 will move the turntable disc 26 from its raised rearward inoperative position shown in FIGURE 3, where the disc is completely above the level of the water 16 in the bath 15, to its lowered forward operative position, as shown in FIGURES 4 and 9, where the lower portion of the disc is immersed in the water. Obviously, when the motor 30 is actuated, this immersed area will continuously change.

In its lowermost position, the slide 32 will contact with the lower ends of the guides 36 to limit its final lower position. When it reaches its uppermost position, it is retained in that position, until released, by means of a ball latch 40. This latch, as shown in FIGURES 7 and 8, comprises the ball 40 which is mounted in a socket 41 that opens outwardly at the edge of the slide plate 32 and is normally biased outwardly by a spring 42. When the slide plate 32 is moved upwardly, the ball 40 will snap into a keeper socket 43 formed in the outer wall of the associated channel guide 36. Releasing means for the ball 40 comprises a leaf spring 44 mounted on the exterior of the guide channel 36 and having a button 45 thereon which can be engaged by the fingers and which has a projection 45a extending inwardly through the spring and into the ball keeper socket 43 so that when it is pushed inwardly, the ball is forced inwardly into the socket 41, against the action of the spring 42, and the ball is forced out of the keeper socket 43 allowing the slide 32 to move downwardly by gravity.

A Chandler tube modified in accordance with this invention is adapted to be mounted on the turntable unit 25 for the test. This tube is shown best in FIGURES 5, 9 and 10. It is an elongated tube 45 of transparent plastic which is adapted to be provided with the blood sample and then formed into circular form with its free ends 46 and 47 coupled together. It is shown before coupling in FIGURE 5 and after coupling in FIGURE 9 and an enlarged detail of the coupled ends is shown in FIGURE 10. The tube itself is of uniform diameter throughout its length but the coupling 48 is a transparent plastic tube of a lesser diameter. It telescopes within both ends of the tubes being actually secured within one of the ends. Thus, it provides a restricted passage or obstruction for the blood sample which is moved in the tube during the test. During the test, the ends of the tube 45 are first coupled together by inserting the free end of the coupling 48 into the adjacent end of the tube where it will be frictionally held. The annular or circular tube loop is then disposed around the disc 28 in the channel 29. This will hold the tube in position around the disc 28 and within the circumference of the disc 26. Rotation of the turntable disc 26 will now cause the annulus formed by the tube to rotate therewith.

USE AND OPERATION OF THE EQUIPMENT IN THE BLOOD TEST

After the unclotted blood is transferred to the plastic tube 45 (FIGURE 9), the ends of the tubing are joined as indicated with the coupling 48 which fits tight enough to hold the ends of the tubing together and prevent leakage of the blood. Thus, when the ends of the plastic tubing 45 are joined, it forms a closed circular loop which contains the anticoagulated blood 50 as shown in FIGURES 9 and 10. This closed circular loop containing the blood mounted on the aluminum disc 28 is illustrated in FIGURE 9. The disc 26 is positioned at about 60 degrees from the horizontal to facilitate recalcification of the blood which will be described. The angle of inclination of the disc is not critical for proper performance of the test.

When an anticoagulant is added to blood, the blood will not clot or form a thrombus unless it is recalcified. This latter term means the addition of a certain concentration of a calcium chloride solution to the blood in order to cause it to clot or thrombose.

After the circular loop 45 containing the unclotted blood 50 is slipped over the disc 28, as described above, the blood is recalcified as follows: A specific volume of calcium chloride solution is injected into the lumen of the circular loop by means of a small hypodermic syringe and needle by inserting the needle through the wall of the plastic tubing. When the small needle is withdrawn the wall of the plastic tube closes and leakage does not occur. In this way the blood is recalcified so it will form a thrombus.

Immediately after the calcium chloride solution has been added to the blood, the disc 26 which is connected to the electric motor 30 is rotated at 15 to 20 r.p.m. by activating the switch 49 connected thereto and disposed in a suitable accessible position on the housing of the bath 15. The time interval between the beginning of rotation of the disc that holds the circular loop containing the recalcified blood and the occurrence of a thrombus is termed the thrombus formation time or thrombotic coagulation time which can be timed with a stop watch or by other means. Prior to the formation of a thrombus, the liquid recalcified blood 50, due to gravity, remains in the bottom of the circular loop 45 while it revolves, as shown in FIGURE 9. It should be noted that the part of the circular loop containing the liquid recalcified blood is substantially submersed in the water (FIGURE 9) of the water bath 15 while the circular loop rotates with the disc and the blood will, in effect, move relative to the loop. However, when a thrombus is produced, the thrombus and liquid recalcified blood form a gel and revolve with the rotating circular loop. This occurrence of a thrombus is termed the end-point. Thus, the thrombus formation time is the time required to produce a thrombus as measured from the beginning of rotation of the circular loop containing recalcified blood and the occurrence of the end-point and can be readily observed. When a conventional type of Chandler apparatus is used to test the thrombus formation time of blood, an external coupling instead of an internal coupling 48 (FIGURES 5 and 10) is used to join the ends of the plastic tubing to form the closed circular loop that contains the recalcified blood. An internal coupling, as used according to my invention, causes partial obstruction to the blood flow as the closed circular loop rotates, whereas an external coupling does not cause obstruction to the blood flow.

Studies showed that thrombus formation begins at the edge of the internal coupling, as indicated schematically in FIGURE 10, which is forced against the recalcified blood as the circular loop 45 rotates. As the loop continues to rotate, the thrombus increases in size and completely obstructs the opening in the internal coupling. When this occurs, the thrombus and entire blood column revolve with the rotating loop and thus produces an end-point which was described above. A thrombus that obstructs the blood flow is formed consistently and a definite end-point easily observed and timed is produced in every test when the proper concentration of calcium chloride is used. A thrombus and end-point like that described does not occur consistently when an external coupling is used.

It is noteworthy to point out that the obstruction provided by the internal coupling simulates an obstruction in a blood vessel and that this feature may prove valuable in this type of test, whereas an external coupling does not cause obstruction and, therefore, does not simulate obstruction in a blood vessel.

With reference to blood flow, the following should be noted: Prior to thrombosis, the liquid recalcified blood (due to gravity) remains in the bottom of the rotating loop 45 and the blood flows by sliding inside the loop.

Thus, in effect, the blood flows opposite to the direction of the rotating loop which produces a blood velocity equivalent to the circumferential velocity of the loop. It is this movement of blood that causes the development of a thrombus as previously described.

Since the thrombus head is composed of blood platelets and fibrin, and since the internal coupling obstruction apparently initiates platelet aggregation to form a thrombus, this test may possibly detect platelet activity which is considered to be an important factor in the development of a thrombus.

As indicated, the dry-box 22 regulates the level of the water 16 so that the water covers an adequate portion of the aluminum disc 26 and associated disc 28 and of the loop 45 containing the blood so as to maintain the proper temperature of the blood while the thrombus formation time is being tested. The dry-box 22 also acts as a dry compartment for the electric motor 30 when it is in an operating position and, further, it serves the purpose of supporting the guides or channels 36 in which the motor support slide 32 operates. The top edge 23 of the dry-box 22 determines the water level 16 in the hot water bath 15, as indicated in FIGURES 3 and 4. If an excess of water is placed in the water bath, the excess water flows over the edge 23, then flows along the bottom 51 of the box to the outside, it being noted that all associated parts of the turntable unit are spaced above the bottom 51 to provide free drainage for the water. Also, any water picked up by the disc 26 and draining therefrom will pass down between the baffle 34 (FIGURE 3) and the edge 23, the baffle being spaced rearwardly thereof. Thus, water does not enter the electric motor 30 when it is in an operating position. This baffle or flange 34 behind the disc 26 thus prevents water lifted by the disc 26 out of the bath from flowing onto the spindle shaft 27 and entering the electric motor 30 while the disc 26 and associated disc 28 are rotating in the water during the performance of a test. The switch 18 turns the hot water bath off and on, and temperature control 17 is used to adjust the temperature of the hot water bath. As stated, the indicator light 19 (FIG. 1) monitors the action of the heating element in the water bath.

Aluminum proved to be a suitable metal to use for the turntable discs 26 and 28 of the unit 25 because it adequately conducts and retains heat from the water in the water bath by keeping the circular plastic loop 45 at the proper temperature and, therefore, maintains a constant temperature of the blood while it is being tested. Furthermore, it was found that a groove 29 which is of the same transverse radius as the outside cross-sectional radius of the plastic tubing, as shown in FIGURES 3 and 4, increased the efficiency of maintaining a constant temperature of the blood since the groove tends to keep the closed, circular loop 45 in close contact with the periphery of disc 28 and front side of disc 26, as shown in FIGURE 4. Of course, the turntable discs can be made of other suitable material that will properly conduct and retain heat.

When a test is performed, the entire turntable unit 25 is pulled up and out of the water of the water bath as shown in FIGURE 3 by means of the knob 37. In this up-position, the closed circular loop 45, containing the blood 50, can be readily slipped over the disc 28 and into the groove 29 while the disc is out of the water. Just as soon as the circular loop 45, containing the blood, is properly positioned on the turntable unit 25, the unit is pushed down into the water 16 of the water bath, as shown in FIGURES 4 and 9, so that it is in an operating position to perform the test.

The turntable unit 25 is held in the up-position, as shown in FIGURES 1, 3 and 6, with the spring and ball 40 latch mechanism, which can be released by fingertip pressure to push the turntable unit down with its discs 26 and 28 partly immersed in the water of the water bath, as shown in FIGURES 4 and 9.

With this arrangement, during the test, the temperature of the blood can be maintained very close to the human body temperature. The rotation of the turntable unit 25 revolves the circular tube loop 45 containing the blood and, in effect, moves the blood in the tube. Also, the blood is moved past an obstruction in the tube provided by the restricted coupling tube section 48. Thus, conditions of the body temperature, restricted blood passage, and movement of blood past the obstruction, realistically simulating actual conditions of an obstructed blood vessel in the human body when a thrombus is formed, are provided.

MODIFICATION OF THE EQUIPMENT

Figure 13:
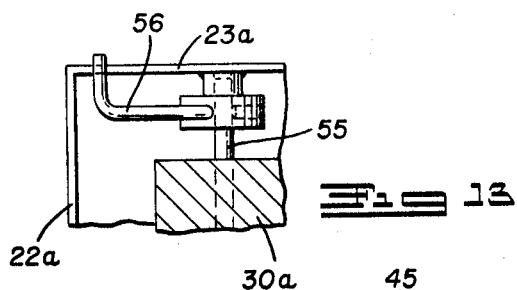
FIG. 13 is a detail in enlarged vertical section showing a stop arrangement for the lowered position of the turntable.
Figure 12:
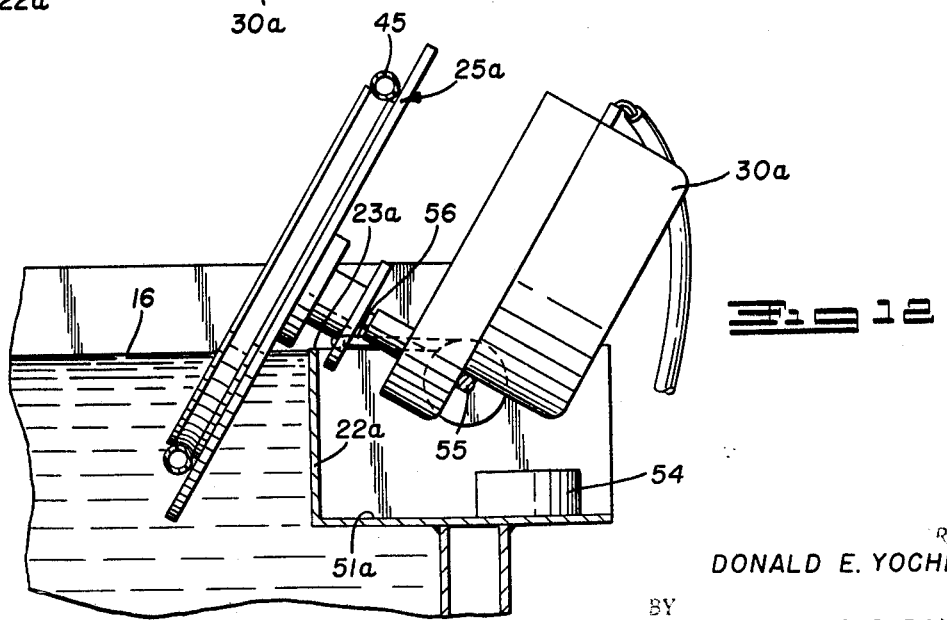
FIGURE 12 is a view similar to FIGURE 11 but showing the turntable in lowered testing position in the water bath.

FIGURES 11 to 13 illustrate a dry-box compartment, rotating unit and motor which are substantially the same construction as that shown in FIGURES 3 and 4 except that the turntable unit is mounted on a pivot so that the loop-carrying discs thereof can be moved into and out of the water of the water bath when a test is performed.

FIGURE 11 illustrates the position of the turntable unit 25a when it is in a loading and unloading position comparable to that shown in FIGURE 3. FIGURE 12 illustrates the turntable unit 25a in position when a test is to be performed as shown in FIGURE 4.

The turntable unit 25a is carried for horizontal swinging movement about a pivot axis 55 located downwardly within the dry-box 22a. A stop button 54 is provided on the bottom of the box and will limit downward swinging movement of the motor into the box so as to leave a space around the button on the bottom 51a of the box for flow of draining water without contact with the motor. Forward and downwardly swinging movement is limited by a stop arm 56 which is rigidly connected to the pivot shaft 55, as shown in FIGURE 13, and which engages the upper edge 23a of the box 22a, to limit downward and forward swinging of the turntable 25a to the position shown in FIGURE 12 where the lower portion is properly immersed in the water of the bath.

It will be apparent from the above that this modified arrangement will be used substantially as the previously described equipment in the blood test and will have substantially the same advantages. These advantages have been set forth in detail but others may be apparent.

Having thus described this invention, what is claimed is:

1. A method of testing a blood sample to determine thrombus formation time which comprises placing an anticoagulated blood sample in liquid form in a tube which is of transparent material without filling the tube so that the blood will be free to move therein, moving the blood in the tube relative to the tube, the tube being of substantially uniform diameter throughout its length to provide a uniform diameter passageway for the blood but being provided with a restricted passageway along its length to provide an obstruction to the flow of blood, maintaining the tube at a temperature of 36.5° C. to 37.5° C., and viewing the tube while continuing the relative movement of the tube and blood and noting when a thrombus forms in the blood.

2. A method according to claim 1 in which the tube is arranged in circular form with its ends connected and in which the obstruction to the movement of blood is provided by an internal coupling of transparent tube material which telescopes in the ends of the tube.

3. An instrument for use in testing a blood sample or the like comprising a water bath having a chamber for receiving the water which is open at its upper end and having means for maintaining the temperature of the water in said chamber, and a turntable mounted in co-operation with said chamber for at least partial immersion therein, and means for rotating said turntable, said turntable being adapted to have a sample of blood mounted thereon for testing.

4. An instrument according to claim 3 including means for supporting said turntable for movement between a testing position where it is at least partially immersed in water in said chamber to a loading and unloading position where it is completely out of the water in said chamber.

5. An instrument according to claim 4 in which said supporting means is a canted slide arrangement.

6. An instrument according to claim 4 in which said supporting means is a horizontal pivot means for supporting the turntable for swinging movement.

7. An instrument according to claim 4 in which said turntable rotating means comprises an electric motor supported in cooperation therewith for movement between its two positions, said chamber having a dry-box associated therewith with a water-level maintaining upper edge and a bottom below that edge, said dry-box being adapted to receive a part of the motor and associated supporting means when the turntable is moved to testing position immersed in the water.

8. An instrument according to claim 7 in which the motor has a drive shaft which carries said turntable which is in the form of a disc, said shaft carrying a baffle behind the disc and spaced axially therefrom to direct water draining from the disc into said dry-box, said baffle being spaced from said upper edge.

9. A system for testing a blood sample to determine the thrombus formation time comprising a tube for receiving the blood sample in liquid form, said tube being of substantially uniform diameter throughout its length to provide a uniform diameter passageway for the blood but being provided with a restricted passageway along its length to provide an obstruction to the flow of the blood, means for mounting the tube to produce relative movement of the blood in the tube, and means for controlling the temperature of the tube to maintain it substantially at 36.5° C. to 37.5° C.

10. A system according to claim 9 in which said tube is formed into circular form, said mounting means comprising a turntable on which the tube is disposed, and means for rotating the turntable.

11. A system according to claim 10 in which said means for controlling the temperature comprises a water bath in which at least a portion of the turntable and tube carried thereby are immersed during the test.

12. A system according to claim 11 in which the tube has open ends which are coupled together by a coupling, that provides the restricted passageway, said coupling comprising a tube section of smaller diameter telescoping in the said ends of said tube.

13. A system according to claim 12 including means for supporting the turntable to permit movement thereof between its immersed condition in the water bath during the test to a position completely out of the water both for loading the blood sample-containing-tube thereon or removing it therefrom.

References Cited

UNITED STATES PATENTS 3,450,501 6/1969 Oberhardt _____ 23—253

OTHER REFERENCES

Chandler, A. B.: I. International Academy of Pathology, 7, 110–114 (1958).

MORRIS O. WOLK, Primary Examiner

R. M. REESE, Assistant Examiner

U.S. Cl. X.R.

23—253; 73—64.1